United States Patent
Ning et al.

(10) Patent No.: US 9,679,301 B2
(45) Date of Patent: Jun. 13, 2017

(54) METHOD, APPARATUS AND COMPUTER PROGRAM PRODUCT FOR DEVELOPING, AGGREGATING, AND UTILIZING USER PATTERN PROFILES

(71) Applicant: Core Wireless Licensing S.a.r.l., Luxembourg (LU)

(72) Inventors: Yang Ning, Beijing (CN); Chen Canfeng, Beijing (CN)

(73) Assignee: Core Wireless Licensing S.a.r.l., Luxembourg (LU)

( * ) Notice: Subject to any disclaimer, the term of this patent is extended or adjusted under 35 U.S.C. 154(b) by 0 days.

(21) Appl. No.: 15/009,587

(22) Filed: Jan. 28, 2016

(65) Prior Publication Data

US 2016/0292699 A1   Oct. 6, 2016

Related U.S. Application Data

(63) Continuation of application No. 11/952,410, filed on Dec. 7, 2007, now abandoned.

(51) Int. Cl.
| | |
|---|---|
| *G06F 17/00* | (2006.01) |
| *G06Q 30/02* | (2012.01) |
| *G06N 5/04* | (2006.01) |
| *H04W 4/00* | (2009.01) |

(52) U.S. Cl.
CPC .......... *G06Q 30/0201* (2013.01); *G06N 5/047* (2013.01); *G06Q 30/02* (2013.01); *H04W 4/008* (2013.01)

(58) Field of Classification Search
CPC . G06Q 30/0255; G06Q 30/00; G06Q 30/0269
USPC .................................................... 706/12, 45
See application file for complete search history.

(56) References Cited

U.S. PATENT DOCUMENTS

| | | | | |
|---|---|---|---|---|
| 6,028,626 A * | 2/2000 | Aviv | ............... | G06K 9/00771 348/152 |
| 2004/0034570 A1* | 2/2004 | Davis | ............... | G06Q 30/0254 705/7.31 |
| 2005/0002561 A1* | 1/2005 | Monachino | .......... | G06K 9/6293 382/159 |
| 2006/0074769 A1* | 4/2006 | Looney | .................. | G06Q 30/02 705/14.66 |
| 2009/0006286 A1* | 1/2009 | Angell | ............... | G06K 9/00771 706/12 |
| 2009/0055759 A1* | 2/2009 | Svendsen | ............... | G11B 27/00 715/764 |

OTHER PUBLICATIONS

Cheung et al., Mining customer product ratings for personalized marketing, 2002, Elsevier Science, pp. 1-13.*

* cited by examiner

*Primary Examiner* — David Vincent
(74) *Attorney, Agent, or Firm* — Core Wireless Licensing Ltd.

(57) ABSTRACT

A method, apparatus and computer program product are provided for generating and utilizing a user pattern profile. In this regard, the user pattern profile can include information regarding service selections made on a user node and movements of a user. The generated user pattern profile can compared to a threshold profile, and based on the results of the comparison, an action can be undertaken.

12 Claims, 7 Drawing Sheets

METHOD, APPARATUS AND COMPUTER PROGRAM PRODUCT FOR DEVELOPING, AGGREGATING, AND UTILIZING USER PATTERN PROFILES

CROSS-REFERENCE TO RELATED APPLICATIONS

This application is a continuation of U.S. patent application Ser. No. 11/952,410, filed on Dec. 7, 2007. The above-identified application is herein incorporated by reference in its entirety.

TECHNOLOGICAL FIELD

Embodiments of the present invention relate generally to profiling users or consumers, and more particularly, relate to a method, apparatus and computer program for developing and utilizing user pattern profiles by capturing the actions of user prior to purchasing or otherwise obtaining a product or service.

BACKGROUND

It has long been the goal of vendors, such as department stores, restaurants and various content providers, to accurately predict the desires and habits of consumers. In order to learn more about consumers, vendors often compile massive quantities of data concerning consumers. The compiled data can originate from a variety of sources and can cover a variety of topics. Some vendors may use the demographic data of a geographical area. Others may track the purchases of a specific consumer to glean information about that consumer, or consumers generally. Some vendors compile data to generate consumer profiles, and the vendors attempt to use these profiles to predict the habits and desires of consumers.

Unfortunately, conventional data gathering mechanisms and the associated consumer profiles cannot accurately predict a consumer's present desires and habits because these consumer attributes are dynamic, given a time and a setting. In some instances, for example, where a vendor has a Very Important Person (VIP) classification for repeat consumers, conventional mechanisms may be satisfactory mechanisms to profile the consumer because history is available for the specific consumer. However, it is more frequent that consumers are not repeat customers, but rather are short-term, transient type consumers which must be profiled in real-time in order to achieve a useable level of accuracy. Attempts have been made to use the purchase history of other consumers to predict the desires of another consumer. However, these mechanisms are inapplicable where no history exists. Even when history does exist, the mechanisms still do not effectively predict consumer desires. As a result, losses in sales and inferior consumer experiences can occur.

For example, consider a consumer that enters a shopping mall. At the time of entry, the consumer may have a product or service in mind. However, conventional mechanisms are unable to predict the real-time desires of the consumer. As such, vendors will be unaware of the consumer's desire for a product or service, and the consumer may be unaware of the vendors that can provide the product or service. If the vendors were aware of the consumer and the consumer's desires, the vendors may find ways to cater to the desires of the consumer, benefiting both the vendors and the consumer. Additionally, using conventional mechanisms, vendors have no means of identifying a consumer's actual interest level in a particular product or service. If a vendor was aware of a consumer's interest level, the vendor may expend efforts efficiently on only those consumers with an appropriate interest level, and not expend efforts on uninterested consumers.

The negative attributes of conventional mechanisms can come as a result of not incorporating information regarding a consumer's physical actions prior to obtaining a desired product or service. Prior actions can include how a consumer navigates through information, such as advertising information, and how the consumer physically moves though stores or shops. These consumer actions can provide important information about a consumer's desires and habits. The actions can reveal a consumer's level of interest in a particular product or service and thus identify a target consumer to a particular store or shop. If a consumer repeatedly visits a particular vendor before moving to other vendors, the actions of the consumer can be indicative of brand loyalty. Further, when aggregated across many consumers, the actions prior to obtaining a product or service, can be indicative of inferior or superior advertising or market power.

Accordingly, a need exists for a mechanism that can develop an accurate and current profile of a consumer or user. In particular, a need exists for a mechanism that can incorporate the actions of a user prior to obtaining a product or service.

BRIEF SUMMARY

A method, apparatus and computer program product are therefore provided for receiving the service selections of a user on a user node and receiving location information with respect to the user node, where, in some embodiments, the service selections involve a user moving through service information such as advertisements. The service selections and location information can be used to update a user pattern profile. In some embodiments, the user pattern profile can provide an indication of the real-time desires and habits of a user or consumer. Further, the user pattern profile can be compared with a threshold profile. Based upon the results of the comparison, an action can be undertaken.

In some embodiments the action undertaken as a result of the comparison between the user pattern profile and the threshold profile can be sending a message to the user node from the service node. The message can provide additional information to the user of the user node regarding service selections that were previously made. In other embodiments, the action undertaken as a result of the comparison between the user pattern profile and the threshold profile can be notifying a trader node of the results and the trader node sending a message to the user node. In some embodiments, a trader node can reside at a vendor's place of business and be accessed by the vendor. In still other embodiments, the action undertaken as a result of comparison between the user pattern profile and the threshold profile can be alerting the trader node of the results.

In some embodiments, the threshold profile can be updated. The threshold profile update can be received from the trader node. As a result, the threshold profile can be updated on the service node. In some embodiments, a comparison of the user pattern profile with the updated threshold profile can be performed when the threshold profile is updated. Based upon the results of the comparing the user pattern profile with the updated threshold profile an action can be undertaken.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. Additionally, the term exemplary as used herein is intended refer to an example and should not be construed to indicate a qualitative assessment.

Various embodiments of the invention can be used to determine and implement a user pattern profile of a user, where the user pattern profile can be comprised of touch patterns and move patterns. The touch patterns can be a log of the sequence and type of user service selections made by a user when interacting with service information, such as, for example, advertising information that has been pushed to a cellular telephone or other mobile device upon entry into a shopping mall. As a user navigates through the service information, the selections, the ordering of the selections, and other selection related information can be stored as a touch pattern in the user pattern profile. A move pattern can also be generated by tracking and logging the physical movements of the user after the user has interacted with the service information. For example, the move pattern may describe a user's movements within a shopping mall. The pattern can include, for example, the stores that were visited, the order in which the stores were visited, the length of time spent in a store, or any other movement related information. By combining one or more touch patterns and movement patterns a user pattern profile can be generated, which can be used to identify regular consumers. According to various embodiments, the user pattern profile can be used in to reveal the desires and habits of a user. Additionally, one or more user pattern profiles can be compared to a predefined threshold profile. If the data within one or more user pattern profiles reaches or exceeds values within the threshold profile, appropriate actions can be taken.

Figure 1:
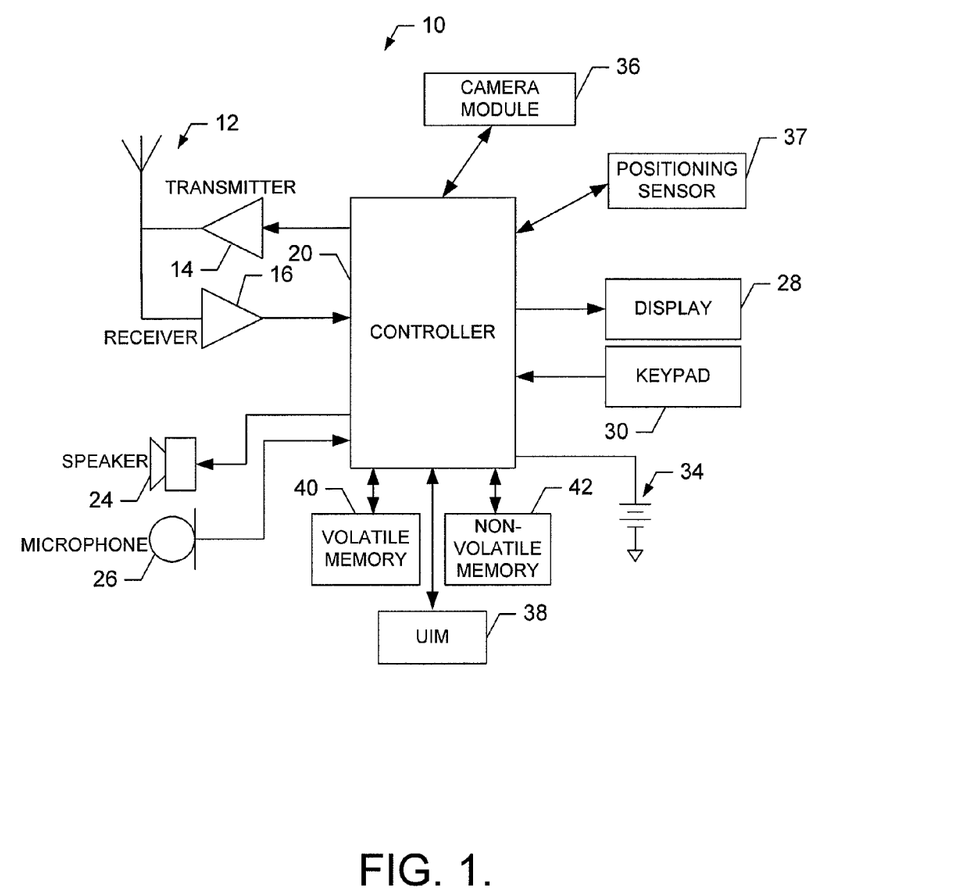
FIG. 1 is a schematic block diagram of a mobile terminal according to an exemplary embodiment of the present invention.

FIG. 1 illustrates a block diagram of a mobile terminal 10 that would benefit from embodiments of the present invention. It should be understood, however, that a mobile telephone as illustrated and hereinafter described is merely illustrative of one type of mobile terminal that would benefit from embodiments of the present invention and, therefore, should not be taken to limit the scope of embodiments of the present invention. While one embodiment of the mobile terminal 10 is illustrated and will be hereinafter described for purposes of example, other types of mobile terminals, such as portable digital assistants (PDAs), mobile phones, mobile communication devices, pagers, mobile computers, mobile televisions, gaming devices, laptop computers, cameras, audio/video recorders, audio/video players, positioning (such as Global Positioning System (GPS)) devices and other types of voice and text communications systems, or any combination of the aforementioned, can readily employ embodiments of the present invention. Furthermore, devices that are not mobile may also readily employ embodiments of the present invention.

Embodiments of the present invention will be primarily described below in conjunction with mobile communications applications. However, it should be understood that the system and method of embodiments of the present invention can be utilized in conjunction with a variety of other applications, both in the mobile communications industries and outside of the mobile communications industries.

The mobile terminal 10 includes an antenna 12 (or multiple antennae) in operable communication with a transmitter 14 and a receiver 16. The mobile terminal 10 further includes a processor, such as a controller 20 or other processing element or computing device, that provides signals to and receives signals from the transmitter 14 and receiver 16, respectively. The signals include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with fourth-generation (4G) wireless communication protocols or the like.

It is understood that the apparatus such as the controller 20 includes means, such as circuitry, desirable for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other hard and/or soft keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are required to operate the mobile terminal 10, as well as optionally providing mechanical vibration as a detectable output.

In some embodiments, the mobile terminal 10 includes a media capturing element, such as a camera, video and/or audio module, in communication with the controller 20. The media capturing element may be any means for capturing an image, video and/or audio for storage, display or transmission. For example, in an exemplary embodiment in which the media capturing element is a camera module 36, the camera module 36 may include a digital camera capable of forming a digital image file from a captured image. As such, the camera module 36 includes all hardware, such as a lens or other optical component(s), and software for creating a digital image file from a captured image. Alternatively, the camera module 36 may include only the hardware needed to view an image, while a memory device of the mobile terminal 10 stores instructions for execution by the controller 20 in the form of software to create a digital image file from a captured image. In an exemplary embodiment, the camera module 36 may further include a processing element such as a co-processor which assists the controller 20 in processing image data and an encoder and/or decoder for compressing and/or decompressing image data. The encoder and/or decoder may encode and/or decode according to, for example, a joint photographic experts group (JPEG) standard or other format.

The mobile terminal 10 may further include a positioning sensor 37 such as, for example, a global positioning system (GPS) module in communication with the controller 20. The positioning sensor 37 may be any means, device or circuitry for locating the position of the mobile terminal 10. Additionally, the positioning sensor 37 may be any means for locating the position and an associated position reference vector associated with images captured by the camera module 36. The position reference vector can describe the direction from which an image was captured. The positioning sensor 37 may include all hardware for locating the position of a mobile terminal 10 or the position of an image and a position reference vector. Alternatively or additionally, the positioning sensor 37 may utilize a memory device of the mobile terminal 10 to store instructions for execution by the controller 20 in the form of software to determine the position of the mobile terminal or the position of an image and a position reference vector. Although the positioning sensor 37 of this example may be a GPS module, the positioning sensor 37 may include or otherwise alternatively be embodied as, for example, an assisted global positioning system (Assisted-GPS) sensor, or a positioning client, which may be in communication with a network device to receive and/or transmit information, such as a sky or floor sensor, for use in determining a position of the mobile terminal 10. In this regard, the position of the mobile terminal 10 may be determined by GPS, as described above, cell ID, signal triangulation, or other mechanisms as well. In one exemplary embodiment, the positioning sensor 37 includes a pedometer or inertial sensor. As such, the positioning sensor 37 may be capable of determining a location of the mobile terminal 10, such as, for example, longitudinal and latitudinal directions of the mobile terminal 10, or a position relative to a reference point such as a destination or start point. Information from the positioning sensor 37 may then be communicated to a memory of the mobile terminal 10 or to another memory device to be stored as a position history or location information. Additionally, the positioning sensor 37 may be capable of utilizing the controller 20 to transmit/receive, via the transmitter 14/receiver 16, location information such as the position of the mobile terminal 10.

The mobile terminal 10 may further include a user identity module (UIM) 38. The UIM 38 may be a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 may store information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an electrically erasable programmable read only memory (EEPROM), flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10.

Figure 2:
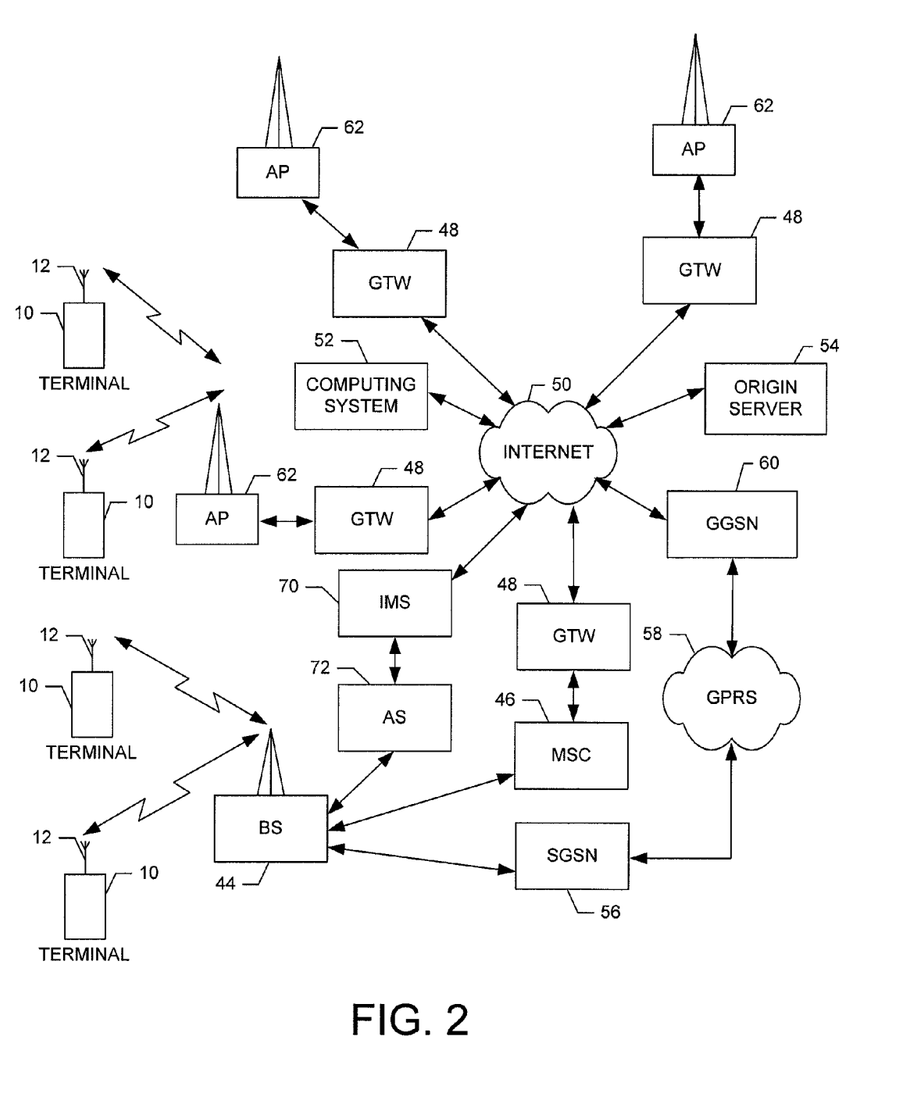
FIG. 2 a schematic block diagram of a wireless communications system according to an exemplary embodiment of the present invention.

FIG. 2 is a schematic block diagram of a wireless communications system according to an exemplary embodiment of the present invention. Referring now to FIG. 2, an illustration of one type of system that may benefit from embodiments of the present invention is provided. The system includes a plurality of network devices. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and embodiments of the present invention are not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In one embodiment, however, the MSC 46 is coupled to a gateway device (GTW) 48, and the GTW 48 is coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52, origin server 54, and/or the like, as described below.

The BS 44 can also be coupled to Internet 50 through an internet protocol multimedia subsystem (IMS) 70 and, in some embodiments, application service (AS) 72. As known to those skilled in the art, IMS can be an internet protocol multimedia subsystem which can provide a framework for delivering internet protocol multimedia to mobile terminals. IMS 70 can provide a link to Internet 50 in a packet switched domain. The link between BS 44 and Internet 50 through IMS 70 can also optionally include AS 72. AS 72 can be an application service that can provide functionality for managing communications sessions.

The BS 44 can also be coupled to a signaling GPRS (General Packet Radio Service) support node (SGSN) 56. As known to those skilled in the art, the SGSN 56 may be capable of performing functions similar to the MSC 46 for packet switched services. The SGSN 56, like the MSC 46, can be coupled to a data network, such as the Internet 50. The SGSN 56 can be directly coupled to the data network. In one embodiment, however, the SGSN 56 is coupled to a packet-switched core network, such as a GPRS core network 58. The packet-switched core network is then coupled to another GTW 48, such as a GTW GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP) and/or the like, to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) may be capable of supporting communication in accordance with any one or more of a number of first-generation (1G), second-generation (2G), 2.5G, third-generation (3G), 3.9G, fourth-generation (4G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as a UMTS network employing WCDMA radio access technology. Some narrow-band analog mobile phone service (NAMPS), as well as total access communication system (TACS), network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), Bluetooth (BT), infrared (IrDA) or any of a number of different wireless networking techniques, including wireless LAN (WLAN) techniques such as IEEE 802.11 (e.g., 802.11a, 802.11b, 802.11g, 802.11n, etc.), world interoperability for microwave access (WiMAX) techniques such as IEEE 802.16, Wibree, ZigBee IEEE 802.15.4, and/or ultra wideband (UWB) techniques such as IEEE 802.15 and/or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

As will be appreciated, by directly or indirectly connecting the mobile terminals 10 and the computing system 52, the origin server 54, and/or any of a number of other devices, to the Internet 50, the mobile terminals 10 can communicate with one another, the computing system, 52, the origin server 54, etc., to thereby carry out various functions of the mobile terminals 10, such as to transmit data, content or the like to, and/or receive content, data or the like from, the computing system 52, and/or the origin server 54, etc.

Although not shown in FIG. 2, in addition to or in lieu of coupling the mobile terminal 10 to computing systems 52 across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX, UWB techniques and/or the like. Computing system 52 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the computing system 52, the mobile terminal 10 may be configured to communicate with the portable electronic devices in accordance with techniques such as, for example, RF, BT, IrDA or any of a number of different wireline or wireless communication techniques, including universal serial bus (USB), LAN, WLAN, WiMAX, UWB techniques and/or the like.

Figure 3:
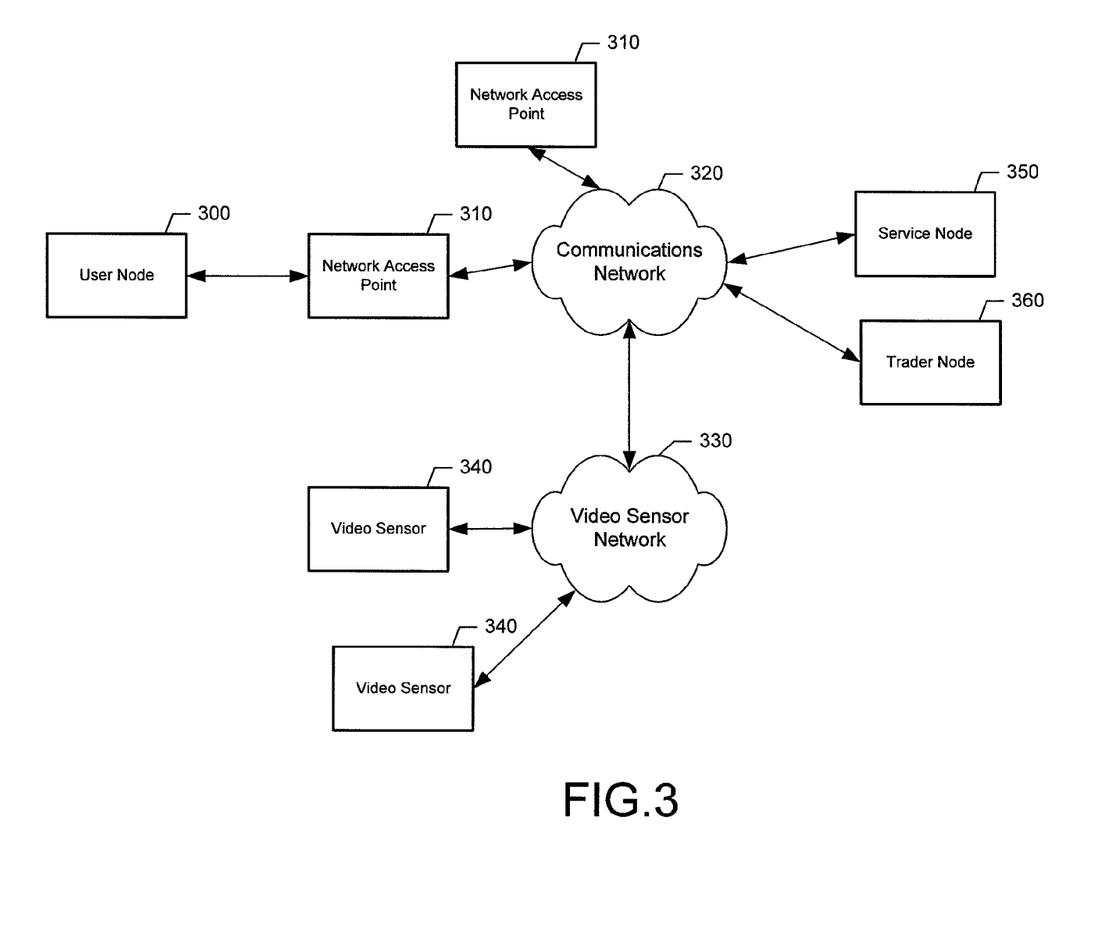
FIG. 3 is a schematic block diagram of a communications system according to an exemplary embodiment of the present invention.

FIG. 3 depicts a schematic block diagram of a communications system according to an exemplary embodiment of the present invention. The communications system of FIG. 3 can include a user node 300, network access points 310, a communications network 320, a video sensor network 330, video sensors 340, a service node 350, and a trader node 360. Note that the configuration of the communications system of FIG. 3 is merely exemplary and that various configurations are contemplated.

User node 300 can be a communications device, such as, for example, mobile terminal 10 of FIG. 1. Further, user node 300 can have a user node identifier (user node ID) that can be unique to a particular user node. Similarly, differing users of user node 300 can have unique user identifiers (user IDs). In some settings, multiple users may be present, and as such, multiple user nodes 300 may be present in the communications system of FIG. 3 as well.

Network access points 310 can be devices which permit a user node 300 to access the communications network 320. In some embodiments, network access point 310 can be, for example, BS 44, or AP 62 of the system of FIG. 2 which could facilitate communication between user node 300 and communication network 320. In some embodiments, user node 300 can be co-located at various network access points 310 such that user node 300 can be accessed by a user at each network access point 310. In some embodiments, network access point 310 can be a point of sale device such as a credit card terminal or a cash register. In some embodiments, network access point 310 can be associated with a video sensor 340 to provide, among other things, the location of a user at a time when network access point 310 is utilized. Additionally, in some embodiments, user node 300 can interact with a plurality of network access points 310 as a user moves into differing areas. As such any number of network access points 310 may be connected to the communications system of FIG. 3.

Video sensors 340 can be devices comprising one or more cameras that can capture media content from the environment in which they are placed. In some embodiments, video sensors 340 can capture multimedia information which can be used to determine the location of a user through image recognition technologies such as, face recognition. In some embodiments, video sensors 340 can utilize wireless communications technology in accordance with techniques such as, for example, RF, BT, IrDA or any of a number of different wireline or wireless communication techniques, including universal serial bus (USB), LAN, WLAN, WiMAX, UWB techniques and/or the like. In some embodiments, video sensors 340 can include the cameras module of mobile terminal 10. Video sensors 340 can also be inputs to a video sensor network 330. In some embodiments, video sensor 340 can directly interact with communications network 320.

Similarly, in some embodiments, radio frequency identification tags can be utilized in the communications system of FIG. 3. RFID tags can be associated with particular locations, such as, for example, shops or booths. In some embodiments RFID tags can be connected to communications network 320. Accordingly, in some embodiments, user nodes 300, such as, mobile terminal 10, can include hardware and/or software to read RFID tags. Accordingly, since the RFID tags can be placed at particular locations and user node 300 can read the RFID tags, user node 300 can determine its location, either directly from an RFID tag, or indirectly using information provided by the RFID tag. For example, in some embodiments, a RFID tag can provide to user node 300, a unique identifier of the RFID tag. User node 300 may then access a database either locally or through the communications network of FIG. 3, to and use the unique identifier to determine various information associated with the RFID tag, such as location information, shop or booth information, or sales information. In some embodiments, RFID tags can provide various information directly to user node 300, such as, for example, the name of an establishment, or contact information. Accordingly, in some embodiments information gathered either directly or indirectly from RFID tags, ban be used to generate a user pattern profile or user pattern vector as described herein.

Video sensor network 330 can be, for example a wireless multimedia sensor network (WMSN) or a closed circuit television (CCTV) network. Devices connected to video sensor network 330 can communicate with each other through video sensor network 330 using various communications techniques such as, for example, RF, BT, IrDA or any of a number of different wireline or wireless communication techniques, including universal serial bus (USB), LAN, WLAN, WiMAX, UWB techniques and/or the like.

Service node (like a service provider) 350 can be a communications, server and/or processing system, such as computing system 52. Service node 350 can perform operations with respect to user pattern profiles, such as comparisons between user pattern profiles and threshold profiles. In some embodiments, service node 350 can be associated with one or more vendors in a particular area, such as, for example, a shopping mall or exhibition. As such, in some embodiments, multiple service nodes 350 can be implemented and connected to communications network 350. Additionally, in some embodiments, service node 350 can be connected to communications network 320 through a network access point 310. In some embodiments, user node 300 can be co-located at various network access points 310 such that user node 300 can be accessed by a user at each network access point 310.

Trader node 360 can be a communications, server, personal computer, cash register and/or processing system, such as computing system 52. Trader node 360 can perform operations with respect to threshold profiles, such as creating and updating threshold profiles. In some embodiments, trader node 360 can be associated with a particular vendor, such as a store, a shop or a stand, and can be located on a vendor's server. As such, in some embodiments, multiple trader nodes 350 can be implemented and connected to communications network 350. In some embodiments, the trader node can be implemented on a point of sale device, such as a credit card terminal or a cash register. Additionally, in some embodiments, trader node 350 can be connected to communications network 320 through a network access point 310 or connected directly to service node 350.

Communications network 320 can be any type of communications network including, but not limited to the communications system of FIG. 2, or the Internet. User node 300 can communicate through network access point 310 with various entities connected to communications network 320. Similarly, service node 350 and trader node 360 can communicate with entities connected to communications network 320. Additionally, entities connected to video sensor network 330 can communicate with any entity connected to communications network 320, and entities connected to communications network 320 can communicate with entities connected to video sensor network 330.

Figure 4:
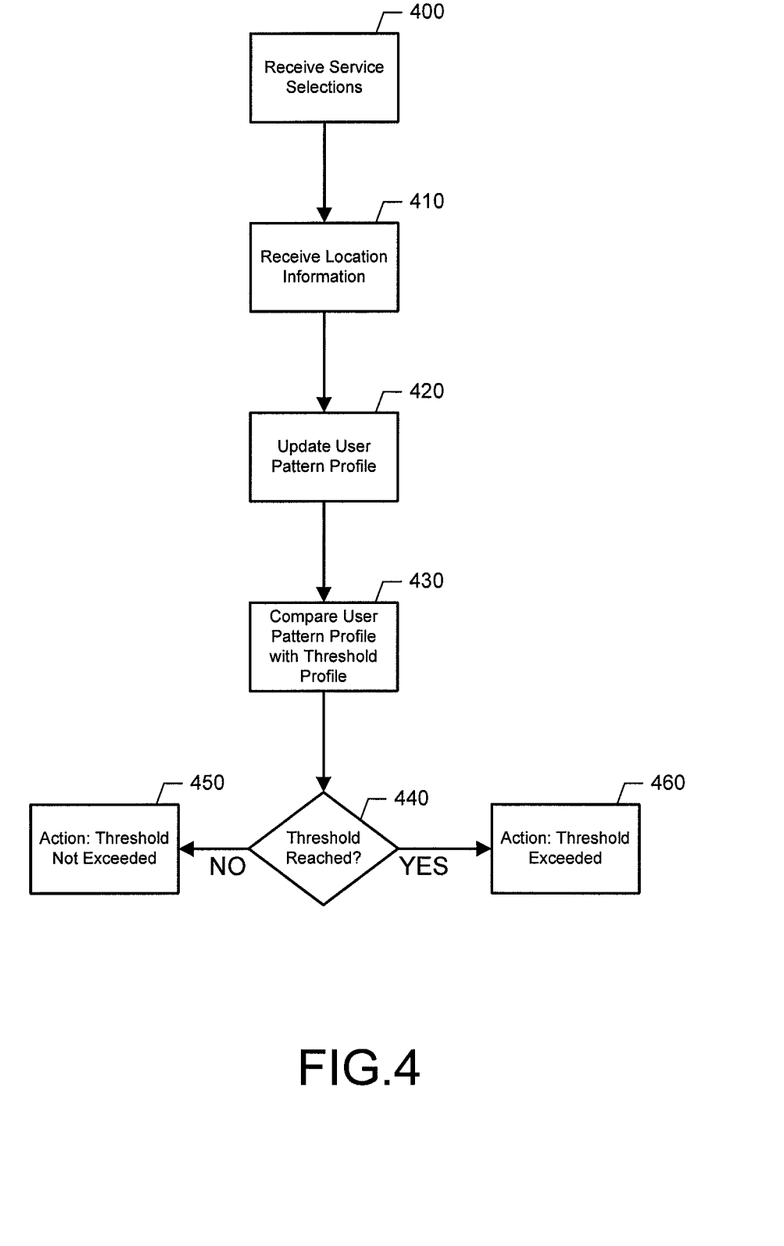
FIG. 4 is a flow diagram depicting a method of developing and utilizing a user pattern profile according to an exemplary embodiment of the present invention.

FIG. 4 is a flow diagram depicting a method of developing and utilizing a user pattern profile according to an exemplary embodiment of the present invention. The method can comprise the operations of receiving service selections at 400, receiving location information at 410, updating the user pattern profile at 420, comparing the user pattern profile with a threshold profile at 430, and determining if the threshold is reached at 440. If the threshold is not reached, appropriate actions can be taken at 450, and if the threshold is reached, appropriate actions can be taken at 460.

In some embodiments, prior to receiving user service selections at 400, a user node 300 can access communications network 320 through a network access point 310. Upon accessing the network, user node 300 can be recognized and paired to a network access point 310. A user node 300 can be paired to a network access point 310 when a communications session has begun between user node 300 and network access point 310. A user can gain access to service node 350 via user node 300 by providing one or more of a user ID, a user node ID, or image recognition, through video sensors 340 using image recognition technology. In addition to accessing the network, user node 300 can cause an initial user pattern profile to be generated on service node 350.

Additionally, service information may be sent to, or activated on, user node 300 at an initial network access point 310. In some embodiments, the service information can be sent from service node 350. The service information can be sent via local broadcasting, such as sky sensors, and each vendor may utilize a separate channel. In some embodiments, the service information can include information regarding vendors within a shopping mall, exhibition, neighborhood, village, or city. The user pattern profile can include user node location information, a user ID, a user node ID, or image recognition information. Location information can be acquired from various sources including, but not limited to, video sensors 340, positioning sensor 37 of mobile terminal 10, or location information associated with a fixed location network access point 310.

Service selections, or touch patterns, can then be received at 400. In some embodiments, service selections can be received by user node 300 or other means. In some embodiments, service information can be navigated through and selected by a user on user node 300. Navigation, selection, and various other user operations performed by a user on user node 300 can be received as service selections. In various embodiments, service selections can be received locally and stored on, for example, volatile memory 40 or nonvolatile memory 42 of mobile terminal 10 and then sent to service node 350.

In some embodiments, the user node 300 can receive response information from service node 350 or trader node 360. Response information can include additional detailed information regarding the selected services, such as an advertisement, a live video feed, updated information, a listing of the most frequently purchased products or services from a selected store, or map information that can route the user to the selected products or services. In addition, in some embodiments, information regarding other users can be sent to the user node 300 such as, the number of people selecting particular service information, the number of users at a selected location or store, or information on how others use a service or product. In some embodiments, a first user may identify a second user that has similar product or service desires and habits. In this regard, the first user may consider the second user's user pattern profile when deciding on a future purchase. In some embodiments, the user service selections can be received by the trader node 360 and trader node 360 can provide response information in the form of, for example, a live video stream or an image to user node 300. Further, in some embodiments, a user may make additional service selections after the user pattern profile is updated at 420. In this regard, the additional service selections can cause the procedure to begin anew by receiving the new service selections at 400. In some embodiments, even when a user does not make additional service selections, updated information regarding selected services can be sent to user node 300. This type of information can be provided regularly or intermittently and can include, for example, other users' related service selections, or other users' movement patterns.

Location information, or movement patterns, can then be received at 410. In some embodiments, location information can be received by user node 300 or other means. In various embodiments, location information can be received locally and stored on, for example, volatile memory 40 or nonvolatile memory 42 of mobile terminal 10 and then sent to service node 350. Additionally, in some embodiments, location information can be acquired from various sources including, but not limited to, video sensors 340, positioning sensor 37 of mobile terminal 10, location information associated with a fixed location network access point 310, ground sensors or sky sensors. The procedure for acquiring new location information can occur intermittently or at predefined time intervals.

The user pattern profile can be updated at 420. In embodiments where the initial user pattern profile was not generated earlier, the operation of updating the user pattern profile can include generating the initial user pattern profile. The user pattern profile can be updated by updating location information associated with the user or user node 300 and sending the updated user pattern profile to service node 350. In some embodiments, the location information can be first updated in a user pattern profile that is local to user node 300, and then the updated user pattern profile can be sent to service node 350. Similarly, the procedure for updating the user pattern profile, either on the user node 300 or on the service node 350, can occur intermittently or at predefined time intervals. In some embodiments, historical location information can be stored for analysis of the user movements and can represent a move pattern. In some embodiments, the historical location information and user service selections can be used to generate a user pattern vector, which in some embodiments can be comprised of a touch pattern and a move pattern. As such, in some embodiments, the user pattern vector can describe the number of times a user visits a location and the number of times a user makes a particular selection. For example, a user pattern vector can describe that a user moved to a first location, three times; a second location, four times; and made selections for a first service, five times, and a second service, eight times. With respect to user pattern vectors generally, the operations described herein with respect to user pattern profiles can be equally applicable to user pattern vectors.

In some embodiments, service node 350 can aggregate updated user pattern profiles from one or more users to determine general information such as, the number of users that are selecting particular service information, the number of users that move to a particular location which may be indicative of brand preferences or the current service status of a particular store, or the number of users that are heading toward a particular location providing particular services. Additionally, user pattern profiles can be grouped by service node 350 according to predetermined criteria to reveal additional aggregate information. Additionally, in some embodiments, service node 350 can utilize a user pattern profile to determine whether a product or service resource issue is causing previously loyal users to choose other stores or locations.

Prior to comparing the user pattern profile with a threshold profile at 430, a threshold profile can be generated. In some embodiments, the threshold profile can be generated on trader node 360 and stored on service node 350. A threshold profile can have threshold values associated with selections and locations. For instance, within a threshold profile a threshold value can include an interest level setting which may be identified by the number of selections by one or more users in a particular category. Further, in some instances, a threshold value can be set at, for example, a number of users at a particular location, such as a retail store, or the number of users heading in the direction of a particular location, such as a retail store. In this regard, a group discount may be implemented when a particular number of users have selected a particular product, and the users may be informed as such by sending a message to user node 300. In some embodiments, complex rules may be created and implemented in order to customize the thresholds for a particular purpose.

Further, in some embodiments, threshold vectors can be generated. In this regard, a user node action threshold vector can be generated that sets thresholds on various activities by one or more user node actions. For example, a user node threshold vector can set a movement pattern that is indicative of an interest level. As such, in some embodiments, the threshold vector can describe the number of times a user visits a location and the number of times a user makes a particular selection. For example, a threshold vector can set a threshold for a situation where a user moves to a first location, three times and makes selections for a first service, five times; or a situation where a user moves to a second location, 1 time and makes selections for a second service, two times. A user pattern profile can be rated against this threshold pattern vector in the comparison operation 430 to determine a rating for the user pattern profile. Another example of a user node threshold vector can be one associated with the number of user nodes 300 heading toward a particular retail establishment. Similarly, a trader node action threshold vector can be generated that sets thresholds on various activities of the trader node 360. For example, where the trader node 360 is associated with a business establishment that provides a service, such as a barber shop, a trader node threshold vector can be set associated with the number of employees available to provide a service. With respect to threshold vectors generally, the operations described herein with respect to threshold profiles can be equally applicable to threshold vectors.

The user pattern profile can be compared with the threshold profile at 430. In some embodiments, the comparison can occur in service node 350. Further, in some embodiments, the comparison operation can occur at regular or irregular time intervals, or each time the user pattern profile is updated at 420. Additionally, in some embodiments, the comparison can occur when changes are made to a threshold profile. Also, a comparison of a user pattern vector with a threshold vector can occur at 420.

Upon completing the comparison, a determination can be made as to the relationship between a user profile and a threshold profile at 440. In some embodiments, a result of the comparison can be sent to trader node 360. In some instances, particular actions can be undertaken at 450 when a threshold value is not reached or exceeded. Additionally, in some instances particular actions can be undertaken at 460 when a threshold value is reached or exceeded. Additionally, in embodiments where a user pattern vector is compared to a threshold pattern vector, various actions can be undertaken as a result of this comparison as well.

With regard to actions which may be taken as a result of the comparison, an exemplary action taken at 450 or 460 can be to send a message to one or more user nodes 300 regarding, for example, new or updated service information, coupons or special offers, and the message can be sent, for example, as a live video stream, or an image. In some embodiments, the trader node may also be alerted, for instance, to the movements of user node 300, such as a movement toward a business establishment indicating a potential customer. In some embodiments, after being alerted, trader node 360 can execute a program. An additional exemplary action taken at 450 or 460 can be to send a message to a user node 300 form service node 350. The message can be sent to one or more user nodes 300 regarding, for example, new or updated service information, coupons or special offers, and the message can be sent, for example, as a live video stream, or an image.

Further, in some embodiments, updates to the threshold profile can be performed. The threshold profile update information can be received by service node 350 from trader node 360. Updates to the threshold profile can include, but are not limited to, updating a threshold value for the number of visitors to an establishment associated with the trader node 360, starting or changing a scheduled program, or updating an image. The threshold profile can then be updated in the service node 350. In some embodiments, when the threshold profile is updated, a comparison at 430 can occur.

In an exemplary implementation of an embodiment of the invention according to FIG. 4 consider a user that enters an exhibition or shopping mall. Upon entry, a network access point can push service information to the user's mobile telephone device. The network access point can also comprise a video sensor that uses face recognition technology to identify the user. The service information pushed to the user's mobile telephone device can include information regarding booths within an exhibition. The user can then select particular information from the service information, and additional detailed information can be sent to the user's mobile telephone device regarding the user's selections. All of the user's selections can be logged and stored as part of the user's user pattern profile. The user can then move throughout the mall or exhibition. Say the user spends ten minutes at a first store, five minutes at a second store, two minutes at a third store, and now the user has returned to the first store. These movements and durations can be stored and analyzed to indicate that the user is likely to purchase a product or service at the first store. The user's movements can be tracked by video sensors located throughout the shopping mall or exhibition. The user's movements can be stored as a movement pattern within a user pattern profile. The user pattern profile can be compared to a threshold profile to determine what actions should be taken or messages sent regarding the user.

Figure 5:
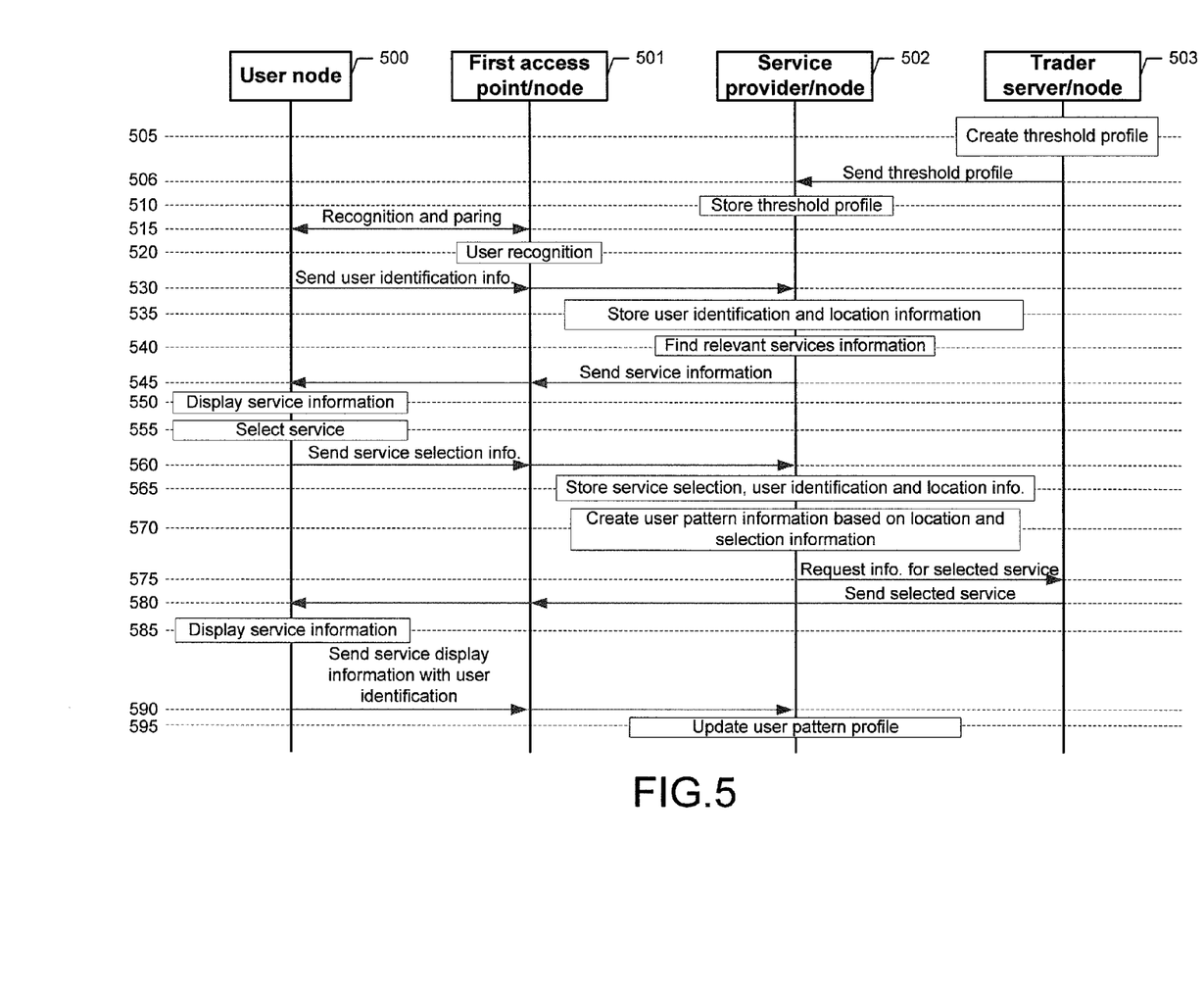
FIG. 5 is a signaling diagram for initializing a user pattern profile according to an exemplary embodiment of the present invention.

FIG. 5 is a signaling diagram for initializing a user pattern profile according to an exemplary embodiment of the present invention. The signaling diagram of FIG. 5 includes user node 500, first network access point 501, service node 502, and trader node 503, in a similar manner, user node 300, network access point 310, service node 350, and trader node 360, respectively, of FIG. 3. Additionally, the sequencing of the signaling in FIG. 5 is used merely for illustration purposes, and as such, it is contemplated that various sequencing of signals can be utilized.

The exemplary signaling sequence of FIG. 5 can begin with creating a threshold profile on trader node 503 at 505. The threshold profile can then be sent to service node 502 at 506. The threshold profile can be stored on service node 502 at 510.

At 515, recognition of a user or user node 500, and a pairing to a first network access point 501, can occur. The user can be recognized at first network access point 501 at 520. At 530, user identification information, such as user ID, user node ID, or other recognition information, can be sent from user node 500 to first network access point 501, and first network access point 501 can relay the user identification information to service node 502. In some embodiments, in addition to sending the user identification information, user node 500 can also send a user pattern profile, which can include location information, to first network access point 501, to be relayed to service node 502. At 535, service node 502 can store the user identification information, and in some embodiments, a user pattern profile.

At 540, service node 502 can find relevant service information, based on the information provided by user node 500. The service information can then be sent to user node 500 via first network access point 501. At 550, the service information can be conveyed to a user by user node 500, and in some embodiments, the service information can be displayed by user node 500.

At 555, a user can make a service selection on user node 500. The selection can be sent to service node 502 via first network access point 501 at 560. Service node 502 can then store the service selection, user identification information, and location information at 565, and create a user pattern profile including the location and selection information at 570. The service node 502 can then request selected information from trader node 503 at 575. In some embodiments, the selected information may reside on service node 502. In some embodiments, service node 502 may also send the user pattern profile, including the location information, to the trader node 503 to be stored on the trader node 503. Trader node 503 can respond to the request by sending selected service information to the user node 500 via the first network access point 501 at 580. At 585, the service information can be conveyed to a user by user node 500, and in some embodiments, the service information can be displayed by user node 500. Information regarding the display of selected service information can then be sent to service node 502 via first network access 501 at 590, and the user pattern profile can be updated at 595.

Figure 6:
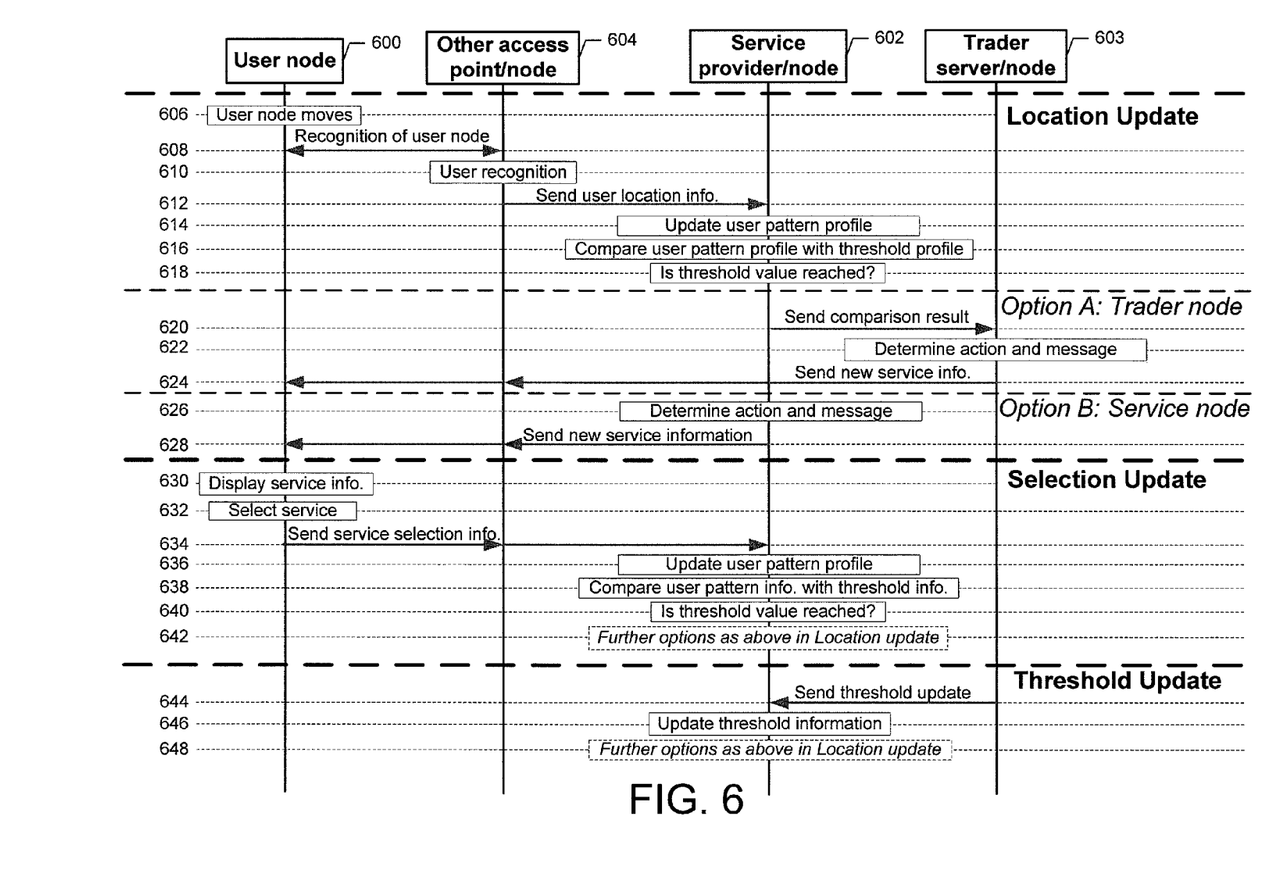
FIG. 6 is a signaling diagram for updating a user pattern profile according to an exemplary embodiment of the present invention.

FIG. 6 is a signaling diagram for updating a user pattern profile according to an exemplary embodiment of the present invention. The signaling diagram of FIG. 6 includes user node 600, network access point 604, service node 602, and trader node 603 in a similar manner to user node 300, network access point 310, service node 350, and trader node 360, respectively, of FIG. 3. Additionally, the sequencing of the signaling in FIG. 6 is used merely for illustration purposes, and as such, it is contemplated that various sequencing of signals can be utilized.

Signaling events 606 through 618 of FIG. 6 describe a location update of a user pattern profile. At 606, user node 600 moves to a new location. At 608, a process of recognizing the user can begin between user node 600 and network access point 604. Network access point 604 can recognize the user at 610, and send user location information to service node 602 at 612. Service node 602 can then update the user pattern profile at 614. A comparison of the user pattern profile with the threshold profile can occur at 616. Service node 602 can then determine if a threshold is reached or exceeded at 618.

Signaling events 620 through 624 of FIG. 6 describe a first exemplary optional response to reaching or exceeding a threshold profile value, where trader node 603 responds. At 620, after it has been determined that a threshold value has been reached or exceeded, the comparison results can be sent from service node 602 to trader node 603. Trader node 603 can then determine the appropriate action to be taken, and message to be sent from trader node 603 at 622. At 624, new service information can be sent to user node 600 from trader node 603 via network access point 604.

Signaling events 626 and 628 of FIG. 6 describe a second exemplary optional response to reaching or exceeding a threshold profile value, where service node 602 responds. At 626, after it has been determined that a threshold value has been reached or exceeded, service node 602 can then determine the appropriate action to be taken, and message to be sent from service node 602. At 628, new service information can be sent to user node 600 from service node 602 via network access point 604.

Signaling events 630 through 642 of FIG. 6 describe a service selection update of a user pattern profile. At 630, service information can be conveyed, or in some embodiments displayed, to the user on user node 600. At 632, a user can make a service selection on user node 600. The selection can be sent to service node 602 via network access point 604 at 634. Service node 602 can then update the user pattern profile at 636. A comparison of the user pattern profile with a threshold profile can occur at 638. Service node 602 can then determine if a threshold is reached or exceeded at 640. At 642, the process can continue as in the location update at 620 or 626.

Signaling events 644 through 648 of FIG. 6 describe a threshold update of a threshold profile. At 644, updated threshold information can be sent to service node 602 from trader node 603. Service node 602 can then store the update at 602. At 648, the process can continue as in exemplary options at 620 or 626 after performing a comparison at 616.

Figure 7:
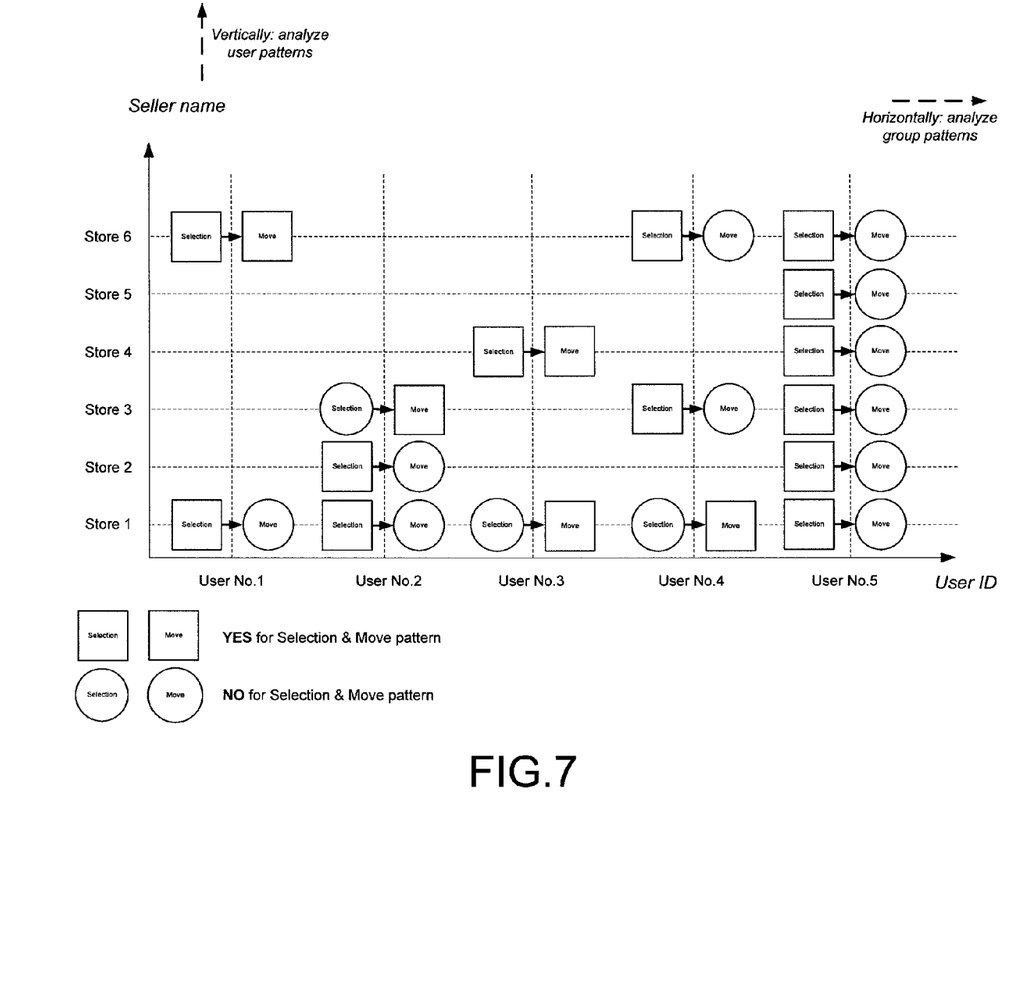
FIG. 7 is a data chart aggregating user and store information according to an exemplary embodiment of the present invention.

FIG. 7 is a data chart aggregating user and store data according to an exemplary embodiment of the present invention. The data chart of FIG. 7 compiles the user pattern profile data into a simplistic format to highlight the types of information that can be gathered from various embodiments of the invention. On the y-axis of the chart, Store 1 through Store 6 can be listed. Each of Store 1 through Store 6 can be, for example, a retail store in a shopping mall or a stand in an exhibition, and we can assume for illustration purposes that Store 1 through Store 6 are competitors. On the x-axis of the chart, User No. 1 through User No. 5 can be listed. Each of User No. 1 through User No. 5 can be, for example, a consumer in a shopping mall or in an exhibition. The data within the chart can indicate the actions of each of User No. 1 through User No. 5. The actions can include whether the user selected a particular store and whether the user moved to the same store. A square box surrounding the action indicates that the user performed the action, and a circle surrounding the action indicates that the user did not perform the action. As a result of the configuration of this exemplary data chart, a user pattern profile can be analyzed by considering the actions of the user (on the vertical), and patterns regarding groups of users can be analyzed with respect to a particular store (on the horizontal).

Exemplary information that can be deduced from the data chart of FIG. 7 can be as follows with respect to analyzing the actions of the users individually. It can be deduced that User No. 1 has a high interest level in a product or service at Store 6 because User No. 1 selected information from Store 6 and then actually moved to Store 6. It can similarly be deduced that User No. 2 is interested in the products or services of Store 3, as indicated by User No. 2 not selecting Store 3 information, but still moving to Store 3. The data can also indicate that User No. 2 may consider alternative products or services, as indicated by User No. 2's selections of Store 1 and Store 2 information, but not moving to Store 1 or Store 2. User No. 3 has indicated a high interest level in a product or service at Store 4, as indicated by a selection of Store 4 information and move to Store 4. However, User No. 3's movement to Store 1, without a selection, can indicate that User No. 3 also has interest in the products or services at Store 1. Similar to User No. 2, User No. 4 has indicated an interest in the products or services of Store 1, as indicated by User No. 4 not selecting Store 1 information, but still moving to Store 1. The data can also indicate that User No. 4 may consider alternative products or services, due to User No. 4's selections of Store 3 and Store 6 information, but not moving to Store 3 or Store 6. Finally, the data can indicate that User No. 5 is merely clicking through all the selections and has little interest in a product or service. This is indicated by User No. 5's selection of information from all the stores, but not moving to any of the stores.

Additionally, the data chart of FIG. 7 can be analyzed with respect to a particular store to reveal information regarding each store by grouping the data according to that store. The data with respect to Store 1 can indicate that, for example, a group-buy discount could be implemented, where if a group of products are sold, each individual purchasing a product within the group can receive a discount. This deduction can come as a result of numerous users either selecting or moving to Store 1. As a result of interpreting the data with respect to Store 2, Store 2 may consider improving its advertising or product quality, since only two users selected Store 2 information, and neither of them moved to Store 2. With respect to Store 3, since one user has moved to Store 3, that user can be identified as a target consumer and promotions may be sent to that user. Store 4 can similarly identify a high interest consumer in User No. 3, since User No. 3 selected Store 4 information and moved to Store 4. In this regard, a threshold profile set by Store 4 may target User No. 3 for a coupon or other promotion. The data further indicates that Store 5 needs to make improvements to encourage interest in its products or services. This is indicated by the fact that no user moved to Store 5 and the only user that selected Store 5 information, User No. 5, is apparently uninterested as indicated by User No. 5's numerous selections without any associated movement. Finally, Store 6 can identify a high interest consumer in User No. 1, since User No. 1 selected Store 6 information and moved to Store 6. In this regard, a threshold profile set by Store 6 may target User No. 1 for a coupon or other promotion.

According to one aspect of the present invention, the electronic device, such as mobile terminal 10, which implements embodiments of the present invention generally operates under control of a computer program product. The computer program product for performing the methods of embodiments of the present invention includes a computer-readable storage medium and computer-readable program code portions, such as a series of computer instructions, embodied in the computer-readable storage medium.

In this regard, FIG. 3 is a flowchart of method, apparatus and program products according to exemplary embodiments of the present invention. It will be understood that each block or step of the flowchart, and combinations of blocks in the flowchart, can be implemented by computer program instructions. These computer program instructions may be loaded onto a computer or other programmable apparatus, such as controller 20, to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems which perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A real time service method in a network comprising:
   receiving, at a service node, a plurality of service selections of a plurality of user nodes, each service selection associated with a location;
   receiving, at the service node, location information of the user nodes;
   updating, at the service node, user pattern profiles associated with the user nodes based on the service selections and the location information for the user nodes;
   aggregating the updated user pattern profiles associated with the user nodes to determine at least one current aggregated value of: a number of user nodes associated with a particular service selection, a number of user nodes associated with a particular location, and a number of user nodes moving towards a particular location;
   obtaining, at the service node, a threshold profile, the threshold profile comprising a threshold value for at least one of: the number of user nodes associated with the particular service selection, the number of user nodes at the particular location and the number of user nodes moving towards the particular location;
   comparing, at the service node, each of the at least one current aggregated value with the corresponding threshold value of the threshold profile; and
   performing, at the service node, an action based on a result of comparing the at least one current aggregated value with the at least one threshold value of the threshold profile.

2. A real time service method of claim 1, wherein each user pattern profile comprises at least one of a service selection pattern on a corresponding user node and a movement pattern of the corresponding user node.

3. A real time service method of claim 2, wherein the movement pattern is generated based on historical location information of the corresponding user node, the movement pattern representing the latest location of the corresponding user node and at least one of: a movement direction of the corresponding user node, a length of time that the corresponding user node spent in the particular location and a number of times that the corresponding user node visited the particular location.

4. A real time service method of claim 1, wherein performing an action based on a result of comparing the at least one current aggregated value with the at least one corresponding threshold value of the threshold profile comprises sending a message to a trader node associated with a particular location and a particular service when a current aggregated value exceeds a corresponding threshold value of the threshold profile.

5. A service node apparatus comprising:
   a communication interface configured to send data to at least one external device and receive data from at least one external device;
   a memory configured to store a plurality of user pattern profiles, an aggregated user pattern profile, and at least one threshold profile; and
   a processor configured to:
      receive, via the communication interface, a plurality of service selections of a plurality of user nodes, each service selection associated with a location;
      receive, via the communication interface, location information of the user nodes;
      update the stored user pattern profiles associated with the user nodes based on the service selections and the location information of the user nodes;
      aggregate the updated user pattern profiles associated with the user nodes to determine at least one current aggregated value of: a number of user nodes associated with a particular service selection, a number of user nodes associated with a particular location, and a number of user nodes moving towards a particular location
      obtain, via the communication interface, a threshold profile, the threshold profile comprising a threshold value for at least one of: the number of user nodes associated with the particular service selection, the number of user nodes at the particular location and the number of user nodes moving towards the particular location;
      compare each of the at least one current aggregated value with the corresponding threshold value of the threshold profile; and
      perform an action based on a result of comparing the at least one current aggregated value with the at least one threshold value of the threshold profile.

6. A service node apparatus of claim 5, wherein each user pattern profile comprises at least one of a service selection pattern on a corresponding user node and a movement pattern of the corresponding user node.

7. A service node apparatus of claim 6, wherein the movement pattern is generated based on historical location information of the corresponding user node, the movement pattern representing the latest location of the corresponding user node and at least one of: a movement direction of the corresponding user node, a length of time that the corresponding user node spent in the particular location and a number of times that the corresponding user node visited the particular location.

8. A service node apparatus of claim 5, wherein the processor is further configured to, when performing an action based on a result of comparing the at least one current aggregated value with the at least one corresponding threshold value of the threshold profile, send via the communication interface a message to a trader node associated with a particular location and a particular service when a current aggregated value exceeds a corresponding threshold value of the threshold profile.

9. A non-transitory computer-readable storage medium having computer-readable program code portions stored therein, the computer-readable program code portions comprising instructions that, when executed, cause a service node to:
   receive a plurality of service selections of a plurality of user nodes, each service selection associated with a location;
   receive location information of the user nodes;
   update user pattern profiles associated with the user nodes based on the service selections and the location information of the user nodes;
   aggregate the updated user pattern profiles associated with the user nodes to determine at least one current aggregated value of: a number of user nodes associated with a particular service selection, a number of user nodes associated with a particular location, and a number of user nodes moving towards a particular location;

obtain a threshold profile, the threshold profile comprising a threshold value for at least one of: the number of user nodes associated with the particular service selection, the number of user nodes at the particular location and the number of user nodes moving towards the particular location;

compare each of the at least one current aggregated value with the corresponding threshold value of the threshold profile; and perform an action based on a result of comparing the at least one current aggregated value with the at least one threshold value of the threshold profile.

10. A non-transitory computer-readable storage medium of claim 9, wherein each user pattern profile comprises at least one of a service selection pattern on a corresponding user node and a movement pattern of the corresponding user node.

11. A non-transitory computer-readable storage medium of claim 9, wherein the movement pattern is generated based on historical location information of the corresponding user node, the movement pattern representing the latest location of the corresponding user node and at least one of: a movement direction of the corresponding user node, a length of time that the corresponding user node spent in the particular location and a number of times that the corresponding user node visited the particular location.

12. A non-transitory computer-readable storage medium of claim 9, wherein the computer-readable program code portions further comprise instructions that cause the service node to, when performing an action based on a result of comparing the at least one current aggregated value with the at least one corresponding threshold value of the threshold profile, send a message to a trader node associated with a particular location and a particular service when a current aggregated value exceeds a corresponding threshold value of the threshold profile.

* * * * *